United States Patent [19]
Akutsu

[11] Patent Number: 5,930,246
[45] Date of Patent: Jul. 27, 1999

[54] BIDIRECTIONAL COMMUNICATION SYSTEM

[75] Inventor: Eisaku Akutsu, Susono, Japan

[73] Assignee: Toyota Jidosha Kabushiki Kaisha, Toyota, Japan

[21] Appl. No.: 08/855,269

[22] Filed: May 14, 1997

[30]  Foreign Application Priority Data

May 15, 1996 [JP]  Japan .................................. 8-120616

[51] Int. Cl.⁶ ...................................................... H04J 3/16
[52] U.S. Cl. ........................................... 370/337; 370/468
[58] Field of Search ..................................... 370/276, 277, 370/278, 280, 282, 294, 329, 336, 337, 347, 468

[56]  References Cited

U.S. PATENT DOCUMENTS

| | | | |
|---|---|---|---|
| 4,949,335 | 8/1990 | Moore | 370/280 |
| 5,200,956 | 4/1993 | Pudney et al. | 370/280 |
| 5,509,028 | 4/1996 | Marque-Pucheu | 375/211 |
| 5,600,636 | 2/1997 | Mäkeläinen | 370/296 |
| 5,754,536 | 5/1998 | Schmidt | 370/468 |

FOREIGN PATENT DOCUMENTS

| | | |
|---|---|---|
| 59-72893 | 4/1984 | Japan . |
| 5-102940 | 4/1993 | Japan . |

*Primary Examiner*—Min Jung
*Attorney, Agent, or Firm*—Pillsbury Madison & Sutro LLP

[57]  ABSTRACT

A bidirectional communication system, including a base station and a plurality of mobile stations, comprises a first unit which alternatively sets a number of transmitting time slots and a number of receiving time slots, each transmitting time slot used by the base station to transmit data to one of the mobile stations on a corresponding one of subchannels assigned for the mobile stations, each receiving time slot used by the base station to receive data from one of the mobile stations on a corresponding one of the subchannels. A second unit changes one of the transmitting time slots and the receiving time slots to a reversed-mode time slot related to a particular one of the mobile stations, whereby the base station uses both the reversed-mode time slot and a corresponding one of the transmitting time slots and the receiving time slots to transmit data to the particular one of the mobile stations or receive data from the particular one of the mobile stations.

16 Claims, 8 Drawing Sheets

BIDIRECTIONAL COMMUNICATION SYSTEM

BACKGROUND OF THE INVENTION (1) Field of the Invention

The present invention relates to a bidirectional communication system, and more particularly to a bidirectional communication system in which a number of transmitting time slots and a number of receiving time slots are alternatively set such that data is transmitted to mobile stations by using the transmitting time slots and data from the mobile stations is received by using the receiving time slots.

(2) Description of the Related Art

A TDMA (Time Division Multiple Access) method for creating multiple subchannels for multiple access is known. In TDMA, the duration T, which is called the frame duration, is subdivided into a number, N, of nonoverlapping subintervals (which are called time slots), each of duration T/N. Then each user who wishes to transmit information is assigned to a particular time slot within each frame.

Japanese Laid-Open Patent Application No. 5-102940 discloses a TDMA/TDD technique for use in a TDMA/TDD communication system which utilizes the TDMA (Time Division Multiple Access) method and a TDD (Time Division Duplex) method in combination. The TDD method is disclosed in the above publication.

FIG. 1 shows the way time slots are set within each frame in the TDMA/TDD system of the above publication. In a multiple access system, the channel shared by multiple users is basically partitioned into independent single-user subchannels. In a TDMA/TDD system, the time slots are assigned to available subchannels.

As shown in FIG. 1, in the TDMA/TDD system of the above publication, a number of transmitting time slots Txi (where i=1 to n) and a number of receiving time slots Rxi (where i=1 to n) are alternatively set within each frame. By using the transmitting time slots Txi, a base station transmits information to "n" mobile stations. By using the receiving time slots Rxi, the base station receives information from the "n" mobile stations. In other words, the transmitting time slots Txi involve a corresponding number of burst signals obtained from a multiplexed transmitting signal sent from the base station to the mobile stations, and the receiving time slots Rxi involve a corresponding number of burst signals obtained from a multiplexed receiving signal sent from the mobile stations to the base station.

In the TDMA/TDD system of the above publication, each pair of a transmitting time slot Txi and at receiving time slot Rxi is assigned to one of available subchannels. A maximum amount of data that can be transmitted by using a single time slot is limited. An upper limit of a communication capacity of a TDMA/TDD system is predetermined through communication system design by taking into account the maximum amount of data within a time slot. Therefore, a communication capacity per unit time related to the TDMA/TDD system is limited due to the upper limit of the communication capacity.

However, there is a demand for increasing the communication capacity per unit time related to a single communication system. FIG. 2 shows a problem of the conventional TDMA-TDD system of the above publication. In the case of the TDMA/TDD system of the above publication, in order to increase the communication capacity per unit time, it is necessary that two or more sets of transmitting time slots Txi and receiving time slots Rxi be assigned to one of the available subchannels. If two sets of transmitting time slots Txi and receiving time slots Rxi are assigned to one subchannel, as indicated by shaded lines in FIG. 2, then the number of the available subchannels, or the number of users, that can be simultaneously used is reduced.

Further, when a transmission of a large amount of data in the TDMA/TDD system of the above publication must be started, it is necessary that there exist a certain number of time slots which are not used for another data transmission at that time and enough to transmit the large amount of data. If there are not the unused time slots at that time, some of the used time slots for another data transmission must be forcefully terminated in order to start the transmission of the large amount of data.

It is difficult for the TDMA/TDD system of the above publication to effectively increase the communication capacity per unit time with no need for reducing the number of the available channels.

SUMMARY OF THE INVENTION

Accordingly, a general object of the present invention is to provide an improved bidirectional communication system in which the above-described problems are eliminated.

Another object of the present invention is to provide a bidirectional communication system which effectively increases the communication capacity per unit time with no need for reducing the number of available subchannels that can be simultaneously used.

The above-mentioned objects of the present invention are achieved by a bidirectional communication system, including a base station and a plurality of mobile stations, which comprises: a first unit which alternatively sets a number of transmitting time slots and a number of receiving time slots, each transmitting time slot used by the base station to transmit data to one of the mobile stations on a corresponding one of subchannels assigned for the mobile stations, each receiving time slot used by the base station to receive data from one of the mobile stations on a corresponding one of the subchannels; and a second unit which changes one of the transmitting time slots and the receiving time slots to a reversed-mode time slot related to a particular one of the mobile stations, whereby the base station uses both the reversed-mode time slot and a corresponding one of the transmitting time slots and the receiving time slots to transmit data to one of the mobile stations or receive data from one of the mobile stations.

In the bidirectional communication system of the present invention, the reversed-mode time slot is added to the transmitting or receiving time slots within the frame, and a particular communication capacity related to one of the mobile stations for which a particular subchannel is assigned is doubled. The other transmitting time slots and the other receiving time slots which are used for the communications between the base station and the other mobile stations remain unchanged. Therefore, in the bidirectional communication system of the present invention, it is not necessary to reduce the number of available subchannels that can be simultaneously used, even when the increased capacity communication is performed.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 3:
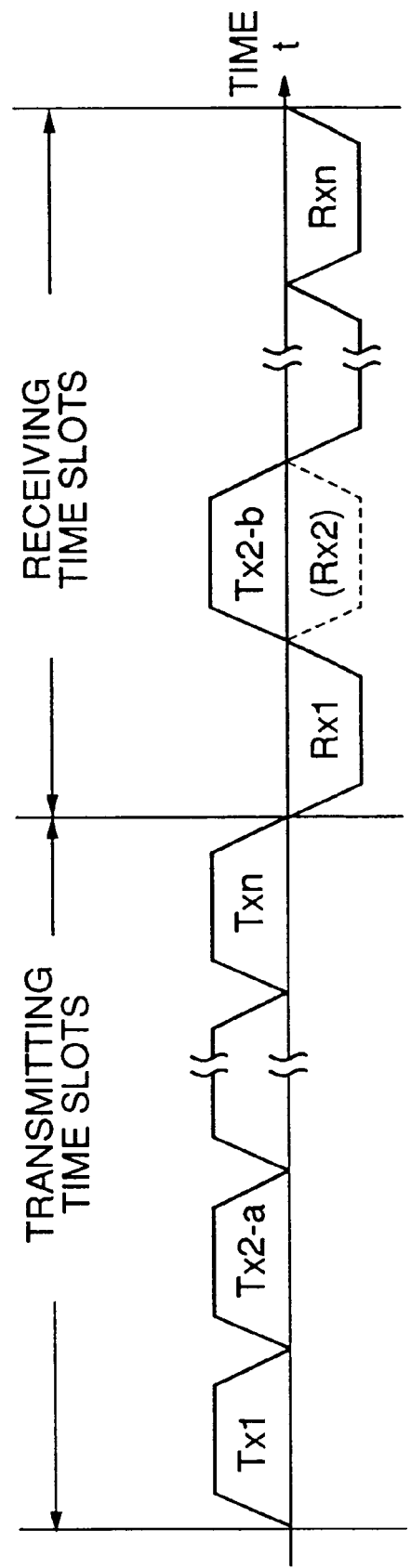
FIG. 3 is a time chart for explaining the way time slots are set in a bidirectional communication system of the present invention.

FIG. 3 shows the way time slots are set within each frame in a bidirectional communication system of the present invention.

Figure 1:
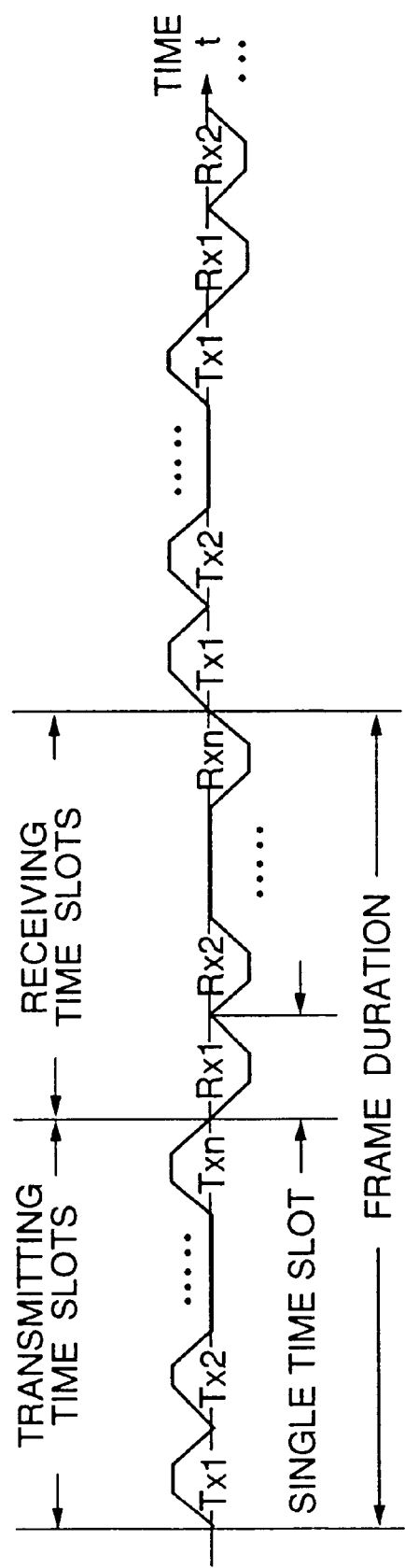
FIG. 1 is a time chart for explaining the way time slots are set in a conventional TDMA-TDD system.
Figure 2:
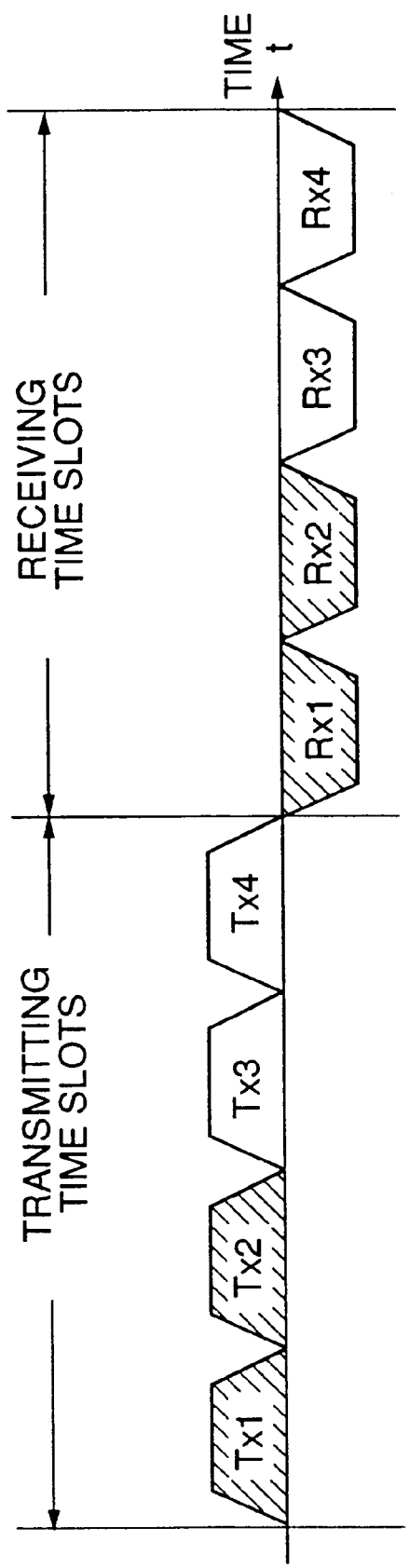
FIG. 2 is a time chart for explaining a problem of the conventional TDMA-TDD system.

As shown in FIG. 3, a number of transmitting time slots Txi (where i=1 to n) and a number of receiving time slots Rxi (where i=1 to n) are alternatively set within each frame in the bidirectional communication system of the present invention. The bidirectional communication system includes a base station and a number, "n", of mobile stations. The bidirectional communication system utilizes the TDMA method which is similar to those described above in conjunction with FIGS. 1 and 2. By using the transmitting time slots Txi, the base station transmits information to the "n" mobile stations. By using the receiving time slots Rxi, the base station receives information from the "n" mobile stations.

In the bidirectional communication system, each pair of a transmitting time slot and a receiving time slot within the frame are assigned to one of available subchannels.

In the example of FIG. 3, a capacity increase request is sent by the base station to a particular one of the mobile stations. The capacity increase request by the base station is contained in a particular time slot "Tx2-a" of the transmitting time slots Txi within the frame, and this time slot "Tx2-a" is transmitted from the base station to the mobile station. This time slot "Tx2-a" is related to a particular subchannel assigned for the mobile station.

The mobile station recognizes that the capacity increase request by the base station has been issued. By using the time slot "Tx2-a", the mobile station performs a transmit/receive mode change of a subsequent receiving time slot to be sent from the mobile station to the base station. That is, a particular time slot "Rx2" (indicated by a dotted line in FIG. 3) of the receiving time slots Rxi within the frame is changed to a transmitting time slot "Tx2-b" (indicated by a solid line in FIG. 3). This time slot "Tx2-b" is a reversed-mode time slot for the receiving time slot "Rx2". The time slot "Tx2-b" is related to the particular subchannel assigned for the mobile station.

The base station receives a receiving time slot from the mobile station, the receiving time slot indicating the end of the transmit/receive mode change performed by the mobile station. By using this time slot, the base station performs a preparation for an increase of a transmission capacity of the base station. Accordingly, the reversed-mode time slot "Tx2-b" is added to the transmitting time slots Txi (where i=1 to n) within the frame, and the total transmission capacity of the base station is increased. A particular transmission capacity related to the particular subchannel assigned for the mobile station is doubled.

In the above example, the transmitting time slots Txi (where i=1, 3, . . . , n) and the receiving time slots Rxi (where i=1, 3, . . . , n) which are used for the communications between the base station and the other mobile stations remain unchanged. Therefore, in the bidirectional communication system of the present invention, it is not necessary to reduce the number of the available subchannels that can be simultaneously used, even when the increased capacity transmission or reception is performed.

The bidirectional communication system of the present invention is especially useful when a large amount of information obtained from a database provided in the base station is acquired by a particular mobile station. After the mobile station has accessed the database of the base station, the base station transmits the large amount of information to the mobile station by using the transmitting time slots only. During this transmission, it is not necessary that the base station receive any data from the mobile station by using the receiving time slots. In such a case, the bidirectional communication system of the present invention is very useful because it can perform the increased capacity transmission by changing a particular one Rxi of the receiving time slots within each frame to a reversed-mode time slot Txi related to the particular subchannel assigned for the mobile station.

In the above example of FIG. 3, the capacity increase request by the base station is sent to the particular mobile station by using one of the transmitting time slots. However, the present invention is not limited to this example. Alternatively, in the bidirectional communication system of the present invention, a capacity increase request may be sent by a particular one of the mobile stations to the base station by using one of the receiving time slots. The bidirectional communication system of the present invention can carry out procedures similar to those in the above example of FIG. 3 when the capacity increase request by the mobile station is issued.

Figure 4:
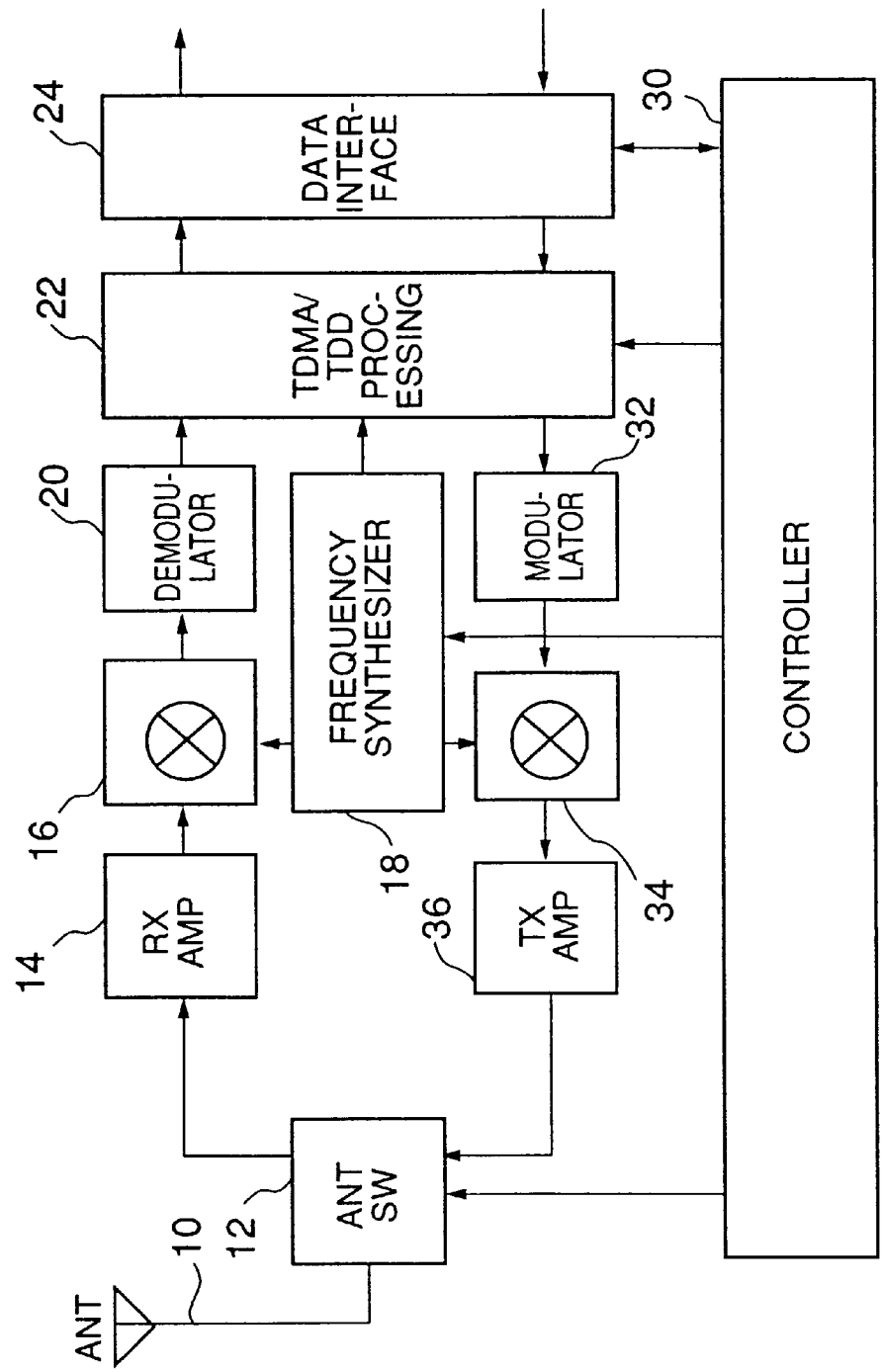
FIG. 4 is a system block diagram of a mobile station to which one embodiment of the present invention is applied.

FIG. 4 shows a structure of a mobile station to which one embodiment of the present invention is applied.

As shown in FIG. 4, in the mobile station, a receiving signal coming into an antenna (ANT) 10 is supplied to a receiving signal amplifier (RX AMP) 14 via an antenna switch (ANT SW) 12. The receiving signal is amplified by the receiving signal amplifier 14, and the amplified signal is supplied to a frequency conversion unit 16.

A frequency synthesizer unit (FRQ SYNC) 18 outputs a locally oscillated frequency signal to the frequency conversion unit 16. At the frequency conversion unit 16, the signal from the receiving signal amplifier 14 is multiplied by the locally oscillated frequency signal to produce an intermediate signal. The intermediate signal from the frequency conversion unit 16 is supplied to a demodulator unit 20.

The demodulator unit 20 produces a demodulated signal from the intermediate signal, and this demodulated signal is supplied to a TDMA/TDD processing unit 22. The TDMA/TDD processing unit 22 takes out a particular time slot Txi, which is related to a particular subchannel assigned for the mobile station, from the transmitting time slots within the demodulated signal. The frequency signal from the frequency synthesizer unit 18 is supplied to the TDMA/TDD processing unit 22.

A controller 30 provides a timing signal to each of the antenna switch 12, the frequency synthesizer unit 18, the TDMA/TDD processing unit 22 and a data interface unit 24 for synchronization of the flow of signals through these elements. In synchronization with the timing signal from the controller 30, the TDMA/TDD processing unit 22 outputs a data signal within the time slot Txi to a following data processing unit (not shown) via a data interface unit 24.

Further, in the mobile station of FIG. 4, transmission data from the data processing unit (not shown) is supplied to the TDMA/TDD processing unit 22 via the data interface unit 24. The TDMA/TDD processing unit 22 produces a receiving time slot Rxi including the transmission data under the control of the controller 30. The TDMA/TDD processing unit 22 supplies a signal indicating the receiving time slot Rxi to a modulator unit 32 in synchronization with the timing signal from the controller 30.

The modulator unit 32 produces a modulated signal from the signal indicating the receiving time slot Rxi, and this modulated signal is supplied to a frequency conversion unit 34. A carrier signal with the locally oscillated frequency from the frequency synthesizer unit 18 is supplied to the frequency conversion unit 34.

At the frequency conversion unit 34, the modulated signal from the modulator unit 32 is multiplied by the carrier signal from the frequency synthesizer unit 18 to produce a high-frequency signal. The high-frequency signal from the frequency conversion unit 34 is supplied to a transmitting signal amplifier (TX AMP) 36.

The transmitting signal amplifier 36 produces an amplified signal from the high-frequency signal, and the amplified signal is supplied to the antenna 10 via the antenna switch 12. In this manner, the signal indicating the receiving time slot Rxi is transmitted from the antenna 10.

Accordingly, the mobile station of FIG. 4 receives information from the base station by using a particular one of the transmitting time slots within each frame sent from the base station, and transmits information to the base station by using a particular one of the receiving time slots within each frame sent to the base station.

In the mobile station of FIG. 4, under the control of the controller 30, the switching of the antenna switch 12 is performed such that the antenna 10 and the receiving signal amplifier 14 are connected to each other by the antenna switch 12 when the transmitting time slots from the base station are received, and the antenna 10 and the transmitting signal amplifier 36 are connected to each other by the antenna switch 12 when the receiving time slots from the mobile stations are transmitted to the base station.

In the bidirectional communication system of the present invention, the base station has a structure which is similar to the construction of the mobile station of FIG. 4.

Figure 5:
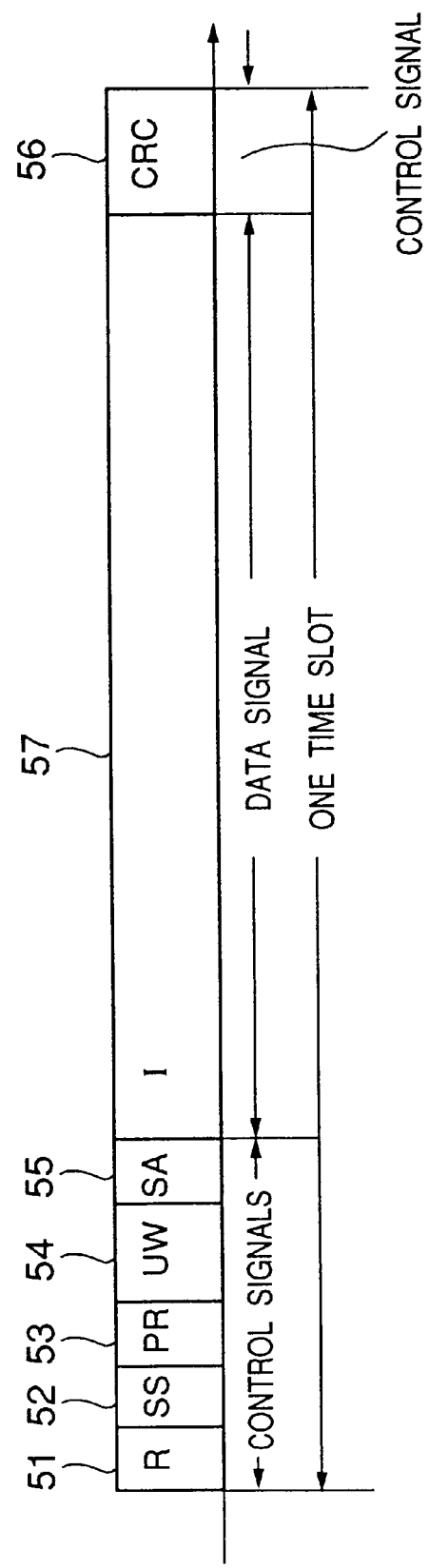
FIG. 5 is a diagram for explaining a format of signals within a time slot used by the bidirectional communication system of the present invention.

FIG. 5 shows a format of signals within a time slot used by the bidirectional communication system of the present invention.

As shown in FIG. 5, the format of signals within one time slot generally has two sections: a control signal section and a data signal section. For example, the control signal section comprises a 4-bit transient response guard signal (R) 51 at the start of the time slot, a 2-bit synchronization signal (SS) 52, a 6-bit preamble signal (PR) 53, a 16-bit unique word signal (UW) 54, and a 16-bit control channel signal (SA) 55. The data signal section comprises a 160-bit transmission data signal (I) 57. Further, the control signal section comprises a 16-bit cyclic redundancy check signal (CRC) 56 at the end of the time slot.

In the bidirectional communication system of the present invention, the control channel signal 55 contained in each time slot includes a first data item SAx (the "x"-th bit of the 16-bit control channel signal 55) and a second data item SAy (the "y"-th bit of the 16-bit control channel signal 55). Each of the first data item SAx and the second data item SAy is set in either the value "1" or the value "0" by one of the base station and the mobile stations in the bidirectional communication system.

For example, when a receiving time slot Rxi in which the first data item SAX is set in the value one is sent from a particular mobile station to the base station during a normal communication mode, the base station recognizes by the received data that a capacity increase request by the mobile station has been issued.

When a transmitting time slot Txi in which the first data item SAx is set in the value one is sent from the base station to the mobile station in reply to the capacity increase request, the mobile station recognizes by the received data that a transmit/receive mode change of a subsequent transmitting time slot by the base station has finished.

When a receiving time slot Rxi in which the second data item SAy is set in the value one is sent from the mobile station to the base station in reply to the notice of the transmit/receive mode change, the base station recognizes by the received data that a preparation for an increase of a receiving capacity of the mobile station has finished.

When a transmitting time slot Txi in which the second data item SAy is set in the value one is sent from the base station to the mobile station in reply to the notice of the capacity increase preparation, the mobile station recognizes that an increased capacity transmission from the base station to the mobile station is currently in process. When a transmission time slot Txi in which the second data item SAy is set in the value zero is sent from the base station to the mobile station, the mobile station recognizes that the increased capacity transmission by the base station has finished.

When a receiving time slot Rxi in which the second data item SAy is set in the value zero is sent from the mobile station to the base station in reply to the notice of the end of the increased capacity transmission, the base station recognizes that the increased capacity reception by the mobile station has finished.

Figure 6:
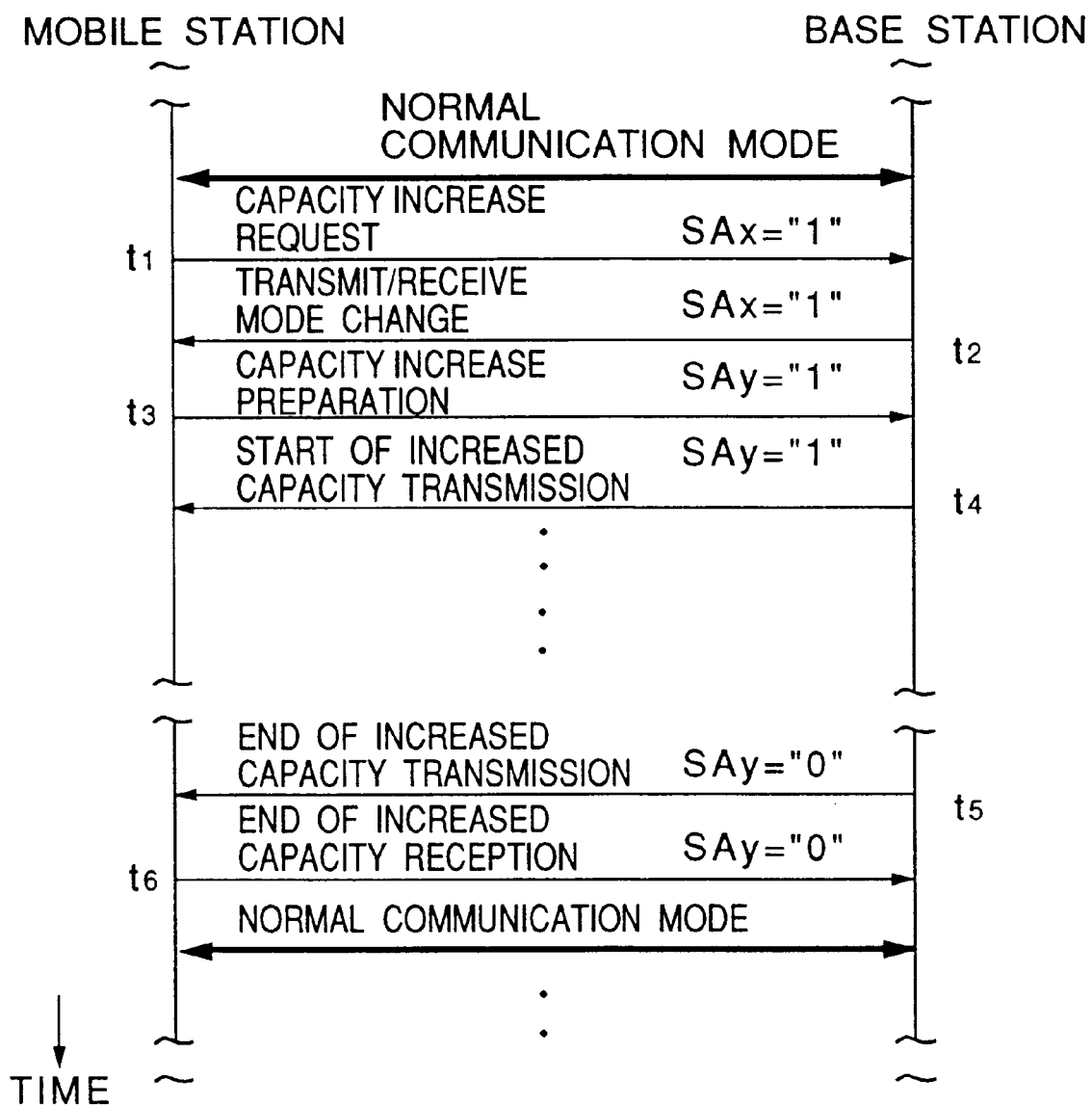
FIG. 6 is a diagram for explaining a sequence of increased capacity communication procedures performed by the bidirectional communication system of the present invention when a capacity increase request from a mobile station is issued.

FIG. 6 shows a sequence of increased capacity communication procedures performed by the bidirectional communication system of the present invention when a capacity increase request from a mobile station is issued.

In the sequence of FIG. 6, before a capacity increase request is issued, a number of transmitting time slots Txi (where i=0 to n) and a number of receiving time slots Rxi (where i=0 to n) are alternatively set within each frame, and the multiple access communications between the base station and the mobile stations in a normal communication mode are carried out.

As shown in FIG. 6, the base station, at time "t1", receives from a particular one of the mobile stations a receiving time slot Rxi in which the first data item SAx is set in the value one (SAx="1"). The receiving time slot Rxi indicates that a capacity increase request from the mobile station has issued, which requests the bidirectional communication system to increase a communication capacity of subsequent transmitting time slots related to the subchannel assigned for the mobile station.

After the capacity increase request by the mobile station, the base station, at time "t2", transmits to the mobile station a transmitting time slot Txi in which the first data item SAx is set in the value one (SAx="1"). This time slot Txi indicates that a transmit/receive mode change of a subsequent transmitting time slot by the base station has finished.

After the notice of the end of the transmit/receive mode change by the base station, the base station, at time "t3", receives from the mobile station a receiving time slot Rxi in which the second data item SAy is set in the value one (SAy="1"). This time slot Rxi indicates that a preparation for an increase of a receiving capacity of the mobile station has finished.

After the notice of the end of the receiving capacity increase preparation by the mobile station, the base station, at time "t4", transmits to the mobile station a transmitting time slot Txi in which the second data item SAy is set in the value one (SAy="1"). This time slot Txi indicates that the increased capacity transmission is currently performed by the base station.

Therefore, at the time "t4", the increased capacity transmission of data to the mobile station by the base station is started. Similarly to the example of FIG. 3, a particular time slot (Txi-a) of the transmitting time slots Txi (where i=1 to n) and a reversed-mode time slot (Txi-b) of the receiving time slots Rxi (where i=1 to n) within each frame are transmitted from the base station to the mobile station by this increased capacity transmission. During the increased capacity transmission, the base station continuously transmits to the mobile station a transmitting time slot in which the second data item SAy is set in the value one.

When the increased capacity transmission of data to the mobile station by the base station has finished, the base station, at time "t5", transmits to the mobile station a transmitting time slot Txi in which the second data item SAy is set in the value zero (SAy="0"). This time slot Txi indicates that the increased capacity transmission of data by the base station has finished.

After the notice of the end of the increased capacity transmission by the base station, the base station, at time "t6", receives from the mobile station a receiving time slot Rxi in which the second data item SAy is set in the value zero (SAy="0"). This time slot Rxi indicates that the increased capacity reception of data by the mobile station has finished.

After the notice of the end of the increased capacity reception by the mobile station, the multiple access communications between the base station and the mobile stations is returned to the normal communication mode.

Figure 7:
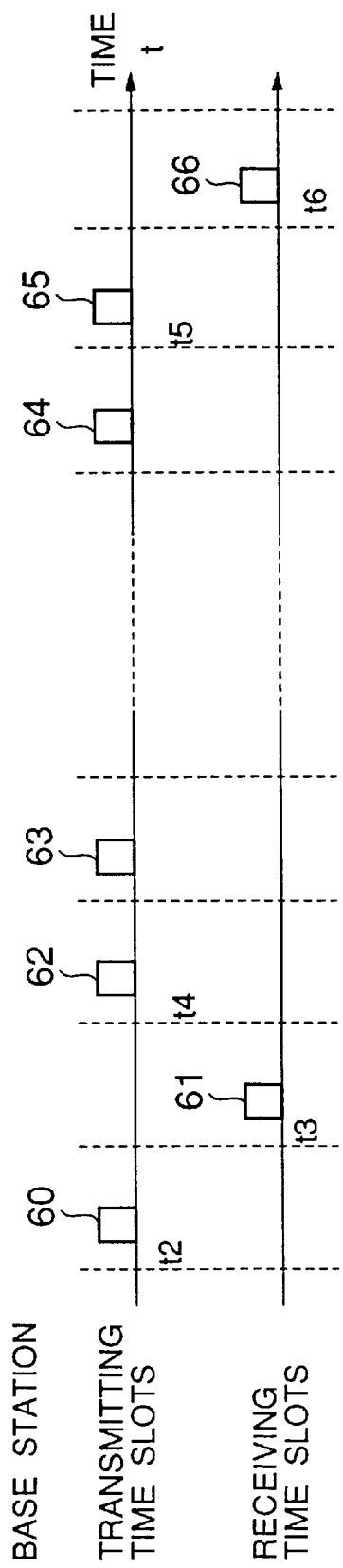
FIG. 7 is a time chart for explaining the increased capacity communication procedures of FIG. 6 performed by the bidirectional communication system of the present invention.

FIG. 7 is a time chart for explaining the increased capacity communication procedures of FIG. 6 performed by the bidirectional communication system of the present invention.

As shown in FIG. 7, the base station, at time "t2", transmits a time slot 60 to the mobile station. At this time, the first data item SAx in the time slot 60 is set in the value one (SAx="1"), and the time slot 60 indicates that a transmit/receive mode change of a subsequent transmitting time slot by the base station has finished.

After the notice of the end of the transmit/receive mode change by the base station, the base station, at time "t3", receives a time slot 61 from the mobile station. At this time, the second data item SAy in the time slot 61 is set in the value one (SAy="1"), and this time slot 61 indicates that a preparation for an increase of a receiving capacity of the mobile station has finished.

After the notice of the end of the receiving capacity increase preparation by the mobile station, the base station, at time "t4", transmits a time slot 62 to the mobile station. At this time, the second data item SAy in the time slot 62 is set in the value one (SAy="1"), and this time slot 62 indicates that the increased capacity transmission by the base station is currently in process.

At the time "t4", the increased capacity transmission of data to the mobile station by the base station is started. During the increased capacity transmission of data, a particular time slot (Txi-a) of the transmitting time slots Txi (where i=1 to n) and a reversed-mode time slot (Rxi-b) of the receiving time slots Rxi (where i=1 to n) within each frame are transmitted from the base station to the mobile station. Time slots 63 through 64 shown in FIG. 7 correspond to those transmitted during this increased capacity transmission of data.

When the increased capacity transmission of data to the mobile station by the base station has finished, the base station, at time "t5", transmits a time slot 65 to the mobile station. At this time, the second data item SAy in the time slot 65 is set in the value zero (SAy="0"). This time slot 65 indicates that the increased capacity transmission of data by the base station has finished.

After the notice of the end of the increased capacity transmission by the base station, the base station, at time "t6", receives a time slot 66 from the mobile station. At this time, the second data item SAy in the time slot 66 is set in the value zero (SAy="0"). This time slot 66 indicates that the increased capacity reception of data by the mobile station has finished.

After the notice of the end of the increased capacity reception by the mobile station, the multiple access communications between the base station and the mobile stations is returned to the normal communication mode.

In the above embodiment of FIG. 7, it is impossible for the base station to receive a receiving time slot from the mobile station when the increased capacity transmission of data by the base station is in process. In order to avoid this, in the bidirectional communication system of the present invention, the base station transmits to the mobile station an interruption-mode time slot for every "N" time slots ("N" is, for example, an integer between 10 and 100) of the increased capacity mode.

In the interruption-mode time slot, the first data item SAx is set in the value zero and the second data item SAy is set in the value one (SAx="0", SAy="1"). This interruption-mode time slot is transmitted from the base station to the mobile station at a time corresponding to a particular time slot (Txi-a) of the transmitting time slots Txi within the frame.

The transmission of a following reversed-mode time slot (Txi-b) of the receiving time slots Rxi within the frame to the mobile station by the base station is interrupted. Only at this time, the base station receives the original mode time slot from the mobile station. The time the base station receives the original mode time slot from the mobile station corresponds to the transmission of the reverse-mode time slot (Txi-b) of the receiving time slots Rxi within the frame. In the present embodiment, the transmission of a reversed-mode time slot to the mobile station by the base station is interrupted at predetermined periods.

After the interruption-mode time slot from the base station is received, the mobile station transmits to the base station an increased capacity mode restart time slot. In the increased capacity mode restart time slot, the first data item SAx is set in the value zero and the second data item SAy is set in the value one (SAx="0", SAy="1"). This time slot indicates that the base station is requested to restart the increased capacity transmission of data. Therefore, the increased capacity transmission of data by the base station is restarted upon receipt of the increased capacity mode restart time slot.

In the above-described embodiment, it is possible to prevent the non-reception of data from the mobile station by the base station for a long time during the increased capacity transmission performed by the base station. Further, in the present embodiment, transmission of data related to a communication error detection or correction to the base station by the mobile station and re-transmission of a responsive message to the mobile station by the base station may be performed for every "N" time slots of the increased capacity mode.

Figure 8:
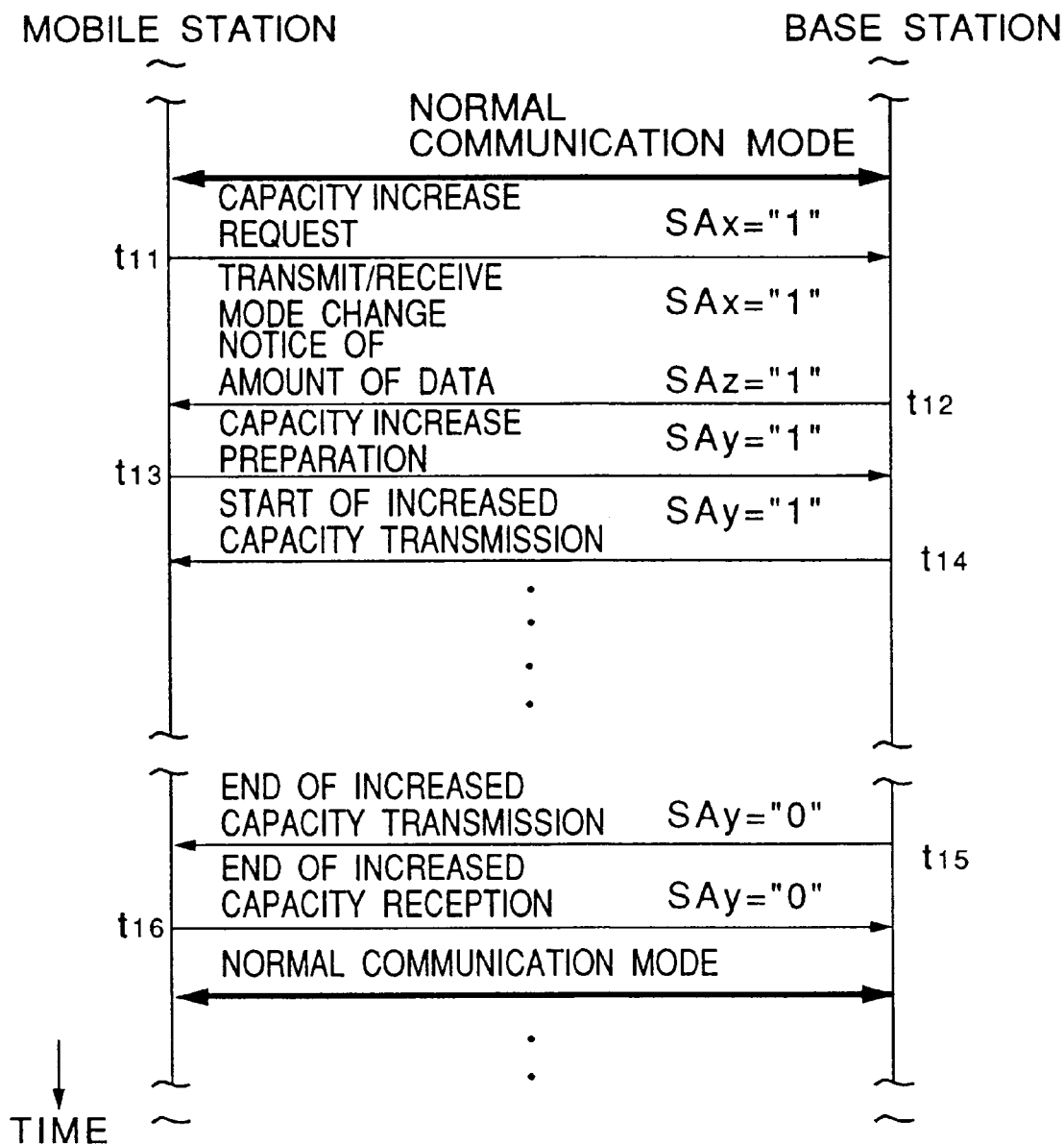
FIG. 8 is a diagram for explaining another sequence of increased capacity communication procedures performed by the bidirectional communication system of the present invention when a capacity increase request from a mobile station is issued.

FIG. 8 shows another sequence of increased capacity communication procedures carried out by the bidirectional communication system of the present invention when a capacity increase request from a mobile station is issued.

Similarly to the sequence of FIG. 6, in the sequence of FIG. 8, before a capacity increase request is issued, a number of transmitting time slots Txi (where i=0 to n) and a number of receiving time slots Rxi (where i=0 to n) are alternatively set within each frame, and the multiple access communications between the base station and the mobile stations in the normal communication mode are carried out.

As shown in FIG. 8, the base station, at time "t11", receives from a particular one of the mobile stations a receiving time slot Rxi in which the first data item SAx is set in the value one (SAx="1"). The receiving time slot Rxi indicates that a capacity increase request from the mobile station has issued, which requests the base station to increase a transmission capacity of subsequent transmitting time slots related to the subchannel assigned for the mobile station.

After the capacity increase request by the mobile station, the base station, at time "t12", transmits to the mobile station a transmitting time slot Txi in which the first data item SAx is set in the value one (SAx="1"). This time slot Txi indicates that a transmit/receive mode change of a subsequent transmitting time slot by the base station has finished.

At the same time, in the transmitting time slot Txi transmitted to the mobile station, a third data item "SAz" (the "z"-th bit of the control channel signal 55) is set in the value one (SAz="1"), and one byte at the start of the transmission data signal 57 of the time slot Txi is set in a value indicating the amount (or the number of bytes or the number of time slots) of data to be transmitted to the mobile station.

Therefore, the time slot Txi further indicates to the mobile station what amount of data will be transmitted from the base station to the mobile station. By using this time slot, the mobile station can detect what amount of time is required for receiving the data from the base station in the increased capacity mode.

After the notice of the end of the transmit/receive mode change performed by the base station, the base station, at time "t13", receives from the mobile station a receiving time slot Rxi in which the second data item SAy is set in the value one (SAy="1"). This time slot Rxi indicates that a preparation for an increase of a receiving capacity of the mobile station has finished.

After the notice of the end of the receiving capacity increase preparation by the mobile station, the base station, at time "t14", transmits to the mobile station a transmitting time slot Txi in which the second data item SAy is set in the value one (SAy="1"). This time slot Txi indicates that the increased capacity transmission is currently performed by the base station.

At this time, the increased capacity transmission by the base station is started. A particular time slot (Txi-a) of the transmitting time slots Txi (where i=1 to n) and a reversed-mode time slot (Txi-b) of the receiving time slots Rxi (where i=1 to n) within each frame are transmitted from the base station to the mobile station by this increased capacity transmission. During the increased capacity transmission, the base station continuously transmits to the mobile station the transmitting time slot in which the second data item SAy is set in the value one.

When the increased capacity transmission by the base station has finished, the base station, at time "t15", transmits to the mobile station a transmitting time slot Txi in which the second data item SAy is set in the value zero (SAy="0"). This time slot Txi indicates that the increased capacity transmission by the base station has finished.

After the notice of the end of the increased capacity transmission by the base station, the base station, at time "t16", receives from the mobile station a receiving time slot Rxi in which the second data item SAy is set in the value zero (SAy="0"). This time slot Rxi indicates that the increased capacity reception by the mobile station has finished.

After the notice of the end of the increased capacity reception by the mobile station, the multiple access communications between the base station and the mobile stations is returned to the normal communication mode.

In the above embodiment of FIG. 8, the amount of data to be transmitted to the mobile station, at the same as the notice of the end of the transmit/receive mode change by the base station, is notified to the mobile station. Therefore, the mobile station can detect what amount of time is required for receiving the data from the base station in the increased capacity communication mode.

The present embodiment is useful for an operator on the mobile station because the operator on the mobile station can perform the preparation for the increase of the receiving capacity of the mobile station with the notice of the amount of the data. Then, when the preparation is finished, the mobile station transmits the time slot to the base station, which indicates the end of the preparation for the increase of the receiving capacity.

Similarly to the embodiment of FIGS. 6 and 7, in the above embodiment of FIG. 8, it is possible to prevent the non-reception of data from the mobile station by the base station for a long time during the increased capacity transmission performed by the base station. Further, in the above embodiment of FIG. 8, transmission of data related to a communication error detection or correction to the base station by the mobile station and re-transmission of a responsive message to the mobile station by the base station may be performed for every "N" time slots of the increased capacity mode.

In the above embodiments of FIGS. 6, 7 and 9 in which the base station transmits to the mobile station an interruption-mode time slot at predetermined periods (that is, once for every "N" time slots of the increased capacity mode), the notice of the amount of data to be transmitted to the mobile station may be sent to the mobile station at the same as the transmission of the interruption-mode time slot or the transmission of the increased-capacity-mode restart request time slot.

Further, in the above embodiments of FIGS. 6, 7 and 8, the first data item SAx, the second data item SAy and the third data item SAz, which are contained in the channel control signal 55 of each time slot, are used to notice the capacity increase request, the transmit/receive mode change, the amount of transmission data, the capacity increase preparation, the start of the increased capacity communication, the end of the increased capacity communication, or the continuation of the increased capacity communication. Alternatively, particular bits of the transmission data signal 57 of each time slot may be used to indicate such notices.

The above embodiments of FIGS. 6, 7 and 8 depict only the case in which the communication capacity related to the data transmitted from the base station to an arbitrary one of the mobile stations is increased. The present invention is not limited to these embodiments. Similarly to the above embodiments, in the bidirectional communication system of the present invention, it is also possible that the communication capacity related to the data transmitted from an arbitrary one of the mobile stations to the base station be increased.

Further, in the above-described embodiments, the bidirectional communication system of the present invention utilizes a TDMA/TDD technique similar to the conventional TDMA/TDD system described above. However, the present invention is also applicable to another type of multiple access system such as a CDMA (code-division multiple access) system.

What is claimed is:

1. A bidirectional communication system including a base station and a plurality of mobile stations, said system comprising:
   first means for alternatively setting a number of transmitting time slots and a number of receiving time slots, each transmitting time slot used by the base station to transmit data to one of the mobile stations on a corresponding one of subchannels assigned for the mobile stations, each receiving time slot used by the base station to receive data from one of the mobile stations on a corresponding one of the subchannels; and
   second means for changing one of the transmitting time slots and the receiving time slots to a reversed-mode time slot related to a particular one of the mobile stations, whereby the base station uses both said reversed-mode time slot and a corresponding one of the transmitting time slots and the receiving time slots to transmit data to said one of the mobile stations or receive data from said one of the mobile stations.

2. The bidirectional communication system according to claim 1, further comprising:
   third means for interrupting the changing of one of the transmitting time slots and the receiving time slots to the reversed-mode time slot by said second means at predetermined periods during an increased capacity communication.

3. The bidirectional communication system according to claim 1, wherein the base station receives from said one of the mobile stations a receiving time slot which indicates an end of a transmit/receive mode change performed by said one of the mobile stations when said second means changes one of the receiving time slots to the reversed-mode time slot, and wherein the base station transmits to said one of the mobile stations a transmitting time slot which indicates an end of a transmit/receive mode change performed by the base station when said second means changes one of the transmitting time slots to the reversed-mode time slot.

4. The bidirectional communication system according to claim 1, wherein the base station receives from said one of the mobile stations a receiving time slot which indicates an amount of data to be transmitted to the base station when said second means changes one of the transmitting time slots to the reversed-mode time slot, and wherein the base station transmits to said one of the mobile stations a transmitting time slot which indicates an amount of data to be transmitted to said one of the mobile stations when said second means changes one of the receiving time slots to the reversed-mode time slot.

5. The bidirectional communication system according to claim 1, wherein the base station receives from one of the mobile stations a receiving time slot which indicates that a capacity increase request from said one of the mobile stations is sent to the base station.

6. The bidirectional communication system according to claim 1, wherein the base station transmits to one of the mobile stations a transmitting time slot which indicates that a capacity increase request from the base station is sent to said one of the mobile stations.

7. The bidirectional communication system according to claim 1, wherein the base station receives from one of the mobile stations a receiving time slot which indicates an end of a capacity increase preparation performed by said one of the mobile stations.

8. The bidirectional communication system according to claim 1, wherein the base station transmits to one of the mobile stations a transmitting time slot which indicates an end of a capacity increase preparation performed by the base station.

9. The bidirectional communication system according to claim 1, wherein the base station receives from one of the mobile stations a receiving time slot which indicates that an increased capacity transmission is currently performed by said one of the mobile stations.

10. The bidirectional communication system according to claim 1, wherein the base station transmits to one of the mobile stations a transmitting time slot which indicates that an increased capacity transmission is currently performed by the base station.

11. The bidirectional communication system according to claim 1, wherein the base station receives from one of the mobile stations a receiving time slot which indicates an end of an increased capacity reception performed by said one of the mobile stations.

12. The bidirectional communication system according to claim 1, wherein the base station transmits to one of the mobile stations a transmitting time slot which indicates an end of an increased capacity transmission performed by the base station.

13. The bidirectional communication system according to claim 1, wherein the base station receives from one of the mobile stations an interruption-mode time slot at predetermined periods during an increased capacity reception performed by the base station.

14. The bidirectional communication system according to claim 1, wherein the base station transmits to one of the mobile station an interruption-mode time slot at predetermined periods during an increased capacity transmission performed by the base station.

15. The bidirectional communication system according to claim 1, wherein said second means changes one of the receiving time slots to a reversed-mode time slot related to a corresponding one of the mobile stations when a capacity increase request from said one of the mobile stations is received by the base station, the capacity increase request increasing a communication capacity of the base station by providing to the base station (i) said reversed-mode time slot and (ii) a corresponding one of the transmitting time slots, whereby the base station uses both said reversed-mode time slot and said corresponding one of the transmitting time slots to transmit data to said one of the mobile stations.

16. The bidirectional communication system according to claim 1, wherein said second means changes one of the transmitting time slots to a reversed-mode time slot related to a corresponding one of the mobile stations when a capacity increase request from the base station is transmitted to said one of the mobile stations, the capacity increase request increasing a communication capacity of said one of the mobile stations by providing to said one of the mobile stations (i) said reversed-mode time slot and (ii) a corresponding one of the receiving time slots, whereby the base station uses both said reversed-mode time slot and said corresponding one of the receiving time slots to receive data from said one of the mobile stations.

\* \* \* \* \*